Patented Jan. 21, 1947

2,414,578

UNITED STATES PATENT OFFICE 2,414,578

HYDROGENATION OF POLYALLYL ALCOHOL

David E. Adelson and Harold F. Gray, Jr., Berkeley, Calif., assignors to Shell Development Company, San Francisco, Calif., a corporation of Delaware No Drawing. Application September 14, 1943, Serial No. 502,372

9 Claims. (Cl. 260—80)

This invention relates to polymeric allyl-type compounds and more particularly to the decolorization and stabilization thereof. The invention is concerned principally with polymeric allyl-type alcohols and their derivatives.

Polymeric allyl-type alcohols can be made by several methods. Apparently regardless of the method of their preparation they are characterized by a yellow color which is undesirable and militates against their use in many applications for which they are otherwise suitable. For instance, the yellow color is objectionable in clear and light-colored coating compositions, molding compositions and the like. Further, polymeric allyl-type alcohols are commonly used as intermediates in the preparation of drying oils and resins of many kinds. The yellow color of the alcohols ordinarily carries over into these derivatives in which it is ordinarily equally objectionable.

The usual processes for removing color from organic compounds fail to decolorize polymeric allyl-type alcohols. Treatment with Activated Alumina, charcoal, fuller's earth, hydrogen peroxide, sodium hypochlorite and potassium permanganate is ineffective. Likewise ineffective are extraction and precipitation with non-solvents. Changes in pH do not affect the color.

It is an object of the present invention to provide for the decolorization of discolored polymeric allyl-type alcohols. Another object is to provide for the stabilization of polymeric allyl-type alcohols. Another object is to provide substantially colorless polymeric allyl-type alcohols and derivatives thereof. Other objects will be apparent from the description of the invention given hereinafter.

These objects are accomplished by the hydrogenation of polymeric allyl-type alcohols and by the use of hydrogenated polymeric allyl-type alcohols in the formation of derivatives therefrom and compositions thereof.

The hydrogenation of polymeric allyl-type alcohols can be effected by catalytic or electrolytic methods. Where electrolytic methods are used, a solution of the polymeric allyl-type alcohol in a solvent conducive to electrolysis is subjected to the action of a direct current flowing between suitable electrodes, such as a platinum gauze anode and a revolving silver cathode. The anode is preferably enclosed in a porous container in accordance with well-known practice. Suitable solvents are water, methyl alcohol, ethyl alcohol, isopropyl alcohol and mixtures thereof. A 25% aqueous solution is preferred. A strong electrolyte is added to serve as a conductor. Substantially any source of direct current can be used. Currents as low as 0.1 ampere or as large as one ampere are suitable, although smaller and larger currents are satisfactory. The optimum duration of treatment is determined by experiment under the particular conditions and with the particular materials involved. Using a current of 0.2 ampere and a 25% aqueous solution of polyallyl alcohol, significant improvement in color has been noted in less than one hour. Further improvement results from longer treatment, e. g. for five to ten hours.

Following electrolytic hydrogenation, the polyallyl alcohol is separated from the solvent electrolyte and other materials present by known methods such as precipitation, distillation, etc., washed and dried. Where the polymer is to be converted to a derivative, used as an intermediate in the synthesis of one or more compounds, or employed in admixture with one or more substances, such conversion, synthesis or admixture can often be made prior to the separation of the polyallyl alcohol from the hydrogenation reaction mixture.

In the catalytic hydrogenation of polymeric allyl-type alcohols, a small amount of an hydrogenation catalyst is suspended in a solution of the polymer and the mixture is then subjected to the action of molecular or nascent hydrogen, usually molecular hydrogen, under heat and pressure. While a measurable improvement in color can be obtained under a variety of conditions and with many catalysts, it has been found that the peculiarities of polymeric allyl-type alcohols render infeasible the teachings of the prior art with respect to the hydrogenation of plastic materials generally, and require for practical operability the adoption of certain particular conditions.

The polymeric allyl-type alcohol is first dissolved in a suitable solvent. The most satisfactory solvent is water. Other solvents, such as methyl alcohol, ethyl alcohol, isopropyl alcohol, and mixtures thereof with one another, with water and with other substances, can be used with less efficiency.

The ratio of polymeric allyl-type alcohol to solvent is preferably 1:3. More dilute solutions are quite satisfactory but are to be avoided in practice because of the unnecessarily increased cost of operation. With more concentrated solutions the rate of color removal is decreased and the quality of the product obtainable is impaired.

The acidity of the solution of the polymeric allyl-type alcohol must be carefully controlled.

Polymeric allyl-type alcohols as ordinarily prepared are acid and must be neutralized or rendered alkaline. Neutralization can be effected by many agents. Sodium hydroxide is suitable but the resulting inorganic products are difficult to remove. Barium hydroxide is more satisfactory in this regard. Other metallic hydroxides and oxides can, of course, be employed. The procedure is to add sufficient alkaline material to bring the pH to 7, or more preferably, to between 8 and 10, subsequently to hydrogenate, and then to separate the inorganic material from the hydrogenated polymeric allyl-type alcohol.

The preferred catalyst is a nickel catalyst prepared in accordance with the procedure described by Raney in U. S. Patent 1,628,190. From about 5 to about 75 parts of catalyst per 100 parts of polymeric allyl-type alcohol have been used with good results, the narrower range of about 10 to about 40 parts of catalyst per 100 parts of polymeric allyl-type alcohol being preferred. The catalyst is usually added directly to the solution of polymeric allyl-type alcohol and suspended therein by agitation. In some cases agitation is unnecessary. If desired, the catalyst particles can be provided with a static electric charge to assist in keeping the particles uniformly distributed and suspended in the solution. A static charge can be provided by agitating the catalyst with dry polymeric allyl-type alcohol before adding solvent. Other methods of providing particular material with a static electric charge are known.

The usual procedure is to place the mixture of polymeric allyl-type alcohol, solvent and catalyst in a suitable vessel, to sweep out atmospheric gases with hydrogen and subsequently to force hydrogen into the vessel under pressure. Relatively low pressures, e. g. 500–1,000 pounds per square inch, are effective. Higher pressures are correspondingly more effective. A pressure of about 1500 pounds per square inch is convenient. Pressures as high as 2,000 to 3,000 pounds per square inch and more can be used. Hydrogen is consumed in the reaction. Where the vessel is not continuously connected with a source of hydrogen under pressure, it may be desirable to make one or more additions of hydrogen during the reaction. Ordinarily, however, such additions are not required.

Temperatures of from about 100° C. to 200° C. can be used. It has been found, however, that temperatures as high as 200° C. result in the formation of a product, an appreciable percentage of which is insoluble in water, the insoluble portion containing a reduced hydroxyl content and being less satisfactory for most purposes than polymeric allyl-type alcohols soluble in water. On the other hand, when temperatures appreciably below about 150° C. are used, hydrogenation is slow and incomplete. Temperatures of from about 155° C. to about 175° C. are preferred.

While usually unnecessary, a second hydrogenation using fresh catalyst produces an improved product.

An alternative procedure consists in substituting for the step of treating a polymeric allyl-type alcohol with a base, such as sodium hydroxide, barium hydroxide, etc., the step of refluxing acidic polymeric allyl-type alcohol over a Raney nickel catalyst, removing catalyst and subsequently hydrogenating over fresh catalyst. Following hydrogenation, the catalyst can be removed by filtering, following which a pure solution of polymeric allyl-type alcohol is conveniently obtained by evaporating the solution to dryness and taking up the polymeric allyl-type alcohol in methyl alcohol. Any of the many other known procedures may, of course, be used.

Hydrogenation can be effected by continuous, as well as batchwise, processes. Atmospheric, reduced and superatmospheric pressures can be used. While hydrogenation in solution is preferred, it may sometimes be possible to hydrogenate fused allyl-type compounds or allyl-type compounds held in dispersion in a fluid medium.

The invention is illustrated by the following examples in which parts are on a weight basis.

Example I

Triallyl borate was prepared by heating allyl alcohol and boric acid in the presence of benzene with the continuous removal of an azeotropic mixture of benzene and the water formed. The product boiled at 180.6° C. to 181.4° C. and had a refractive index ($n20/D$) of 1.4278.

A slow stream of air was entrained into the triallyl borate at 130° C. for 120 hours. The resulting product consisted largely of polytriallyl borate and was a transparent yellow gel. 233 parts of the polymer were easily hydrolyzed to polyallyl alcohol and boric acid by refluxing with 600 parts of water. The solution was cooled to 3° C. and the solid boric acid removed by filtration. Monomeric allyl alcohol was taken off by distillation. The residual polyallyl alcohol was a dark brown, transparent, viscous liquid. A solution of the polyallyl alcohol in a small amount of water had a pH between 4 and 5.

25 parts of the polyallyl alcohol were dissolved in 75 parts of water; 10.5 parts of barium hydroxide $Ba(OH)_2 \cdot 8H_2O$ were added and dissolved. The solution was transferred to a bomb containing a few crystals of barium hydroxide. The solution was strongly alkaline to phenolphthalein in 25% solution. A few grams of Raney nickel catalyst were added. Gaseous hydrogen was forced into the bomb under an initial pressure of 1510 p. s. i. The bomb was maintained at 160° C. for 16 hours. The resulting solution was nearly colorless. Evaporation to dryness under reduced pressure in an atmosphere of nitrogen gave a clear, slightly yellow resin, most of which was soluble in ethyl alcohol as well as in water.

Example II

Another portion of 25 parts of discolored polyallyl alcohol dissolved in 75 parts of water and made alkaline with barium hydroxide was heated with hydrogen under pressure over Raney nickel catalyst at 200° C. for 16 hours. The color of the polyallyl alcohol was markedly improved but only 67% of the treated material was soluble in water.

Example III

Polyallyl alcohol prepared and hydrogenated in accordance with the procedure outlined in Example I was found to be acid to phenolphthalein. It was dissolved in water, again made alkaline to phenolphthalein and subjected to the action of hydrogen under an initial pressure of 1510 p. s. i. over fresh Raney nickel catalyst at 160° C. for 16 hours. The resulting solution was colorless. Evaporation to dryness yielded a colorless resin.

Example IV

A mixture of 465 parts of allyl alcohol and 30 parts of hydrogen peroxide was heated at 100° C. under a reflux condenser. The hydrogen peroxide consumed was replaced at frequent intervals. At the end of the reaction, unreacted monomer was removed by distillation under reduced pressure in an atmosphere of nitrogen. The residue was discolored viscous polyallyl alcohol.

25 parts of the polyallyl alcohol were dissolved in water and made alkaline to methyl red with barium hydroxide. The mixture was then treated with hydrogen under an initial pressure of 1520 p. s. i. for 16 hours at 160° C. The resulting solution was water-white. Evaporation to dryness yielded 20.3 grams of treated polyallyl alcohol.

*Example V*

Discolored polyallyl alcohol obtained by the hydrolysis of polyallyl borate was refluxed over Raney nickel for one hour. It was then separated from the catalyst, placed in a bomb containing a small amount of calcium oxide and treated with hydrogen under a pressure initially of 1520 p. s. i. at 160° C. for 16 hours. The color of the resulting polyallyl alcohol was substantially water-white.

Rehydrogenation at 160° C. for 15 hours with hydrogen initially under a pressure of 1720 p. s. i. rendered the polymer perfectly water-white.

The allyl-type alcohols with the polymers of which the invention is principally concerned are compounds having an olefinic double bond between two carbon atoms, one of which is directly connected to a saturated carbinol carbon atom. They have in the molecule a structure which can be represented by the general formula

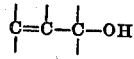

Preferred allyl-type alcohols have a terminal methylene group attached by a double bond to a carbon atom which is directly attached to a saturated carbinol carbon atom as represented by the general structural formula

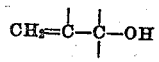

Further preferred are allyl-type alcohols of the latter formula wherein the carbinol carbon atom is primary or secondary as represented by the formula

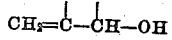

For the purposes of the present invention allyl-type alcohols have no more than 18 carbon atoms in the molecule and have at least one unsaturated carbon-to-carbon linkage for each 6 carbon atoms.

Examples of preferred allyl-type alcohols are allyl alcohol, methallyl alcohol, ethallyl alcohol, chloroallyl alcohol, 3-hydroxy-butene-1, 3-hydroxy-pentene-1, 3-hydroxy-hexene-1, 3-hydroxy-3-methyl-butene-1, 3-hydroxy-3-methyl-pentene-1, 3-hydroxy-2-methyl-butene-1, 3-hydroxy-2-methyl-pentene-1, 3-hydroxy-2,3-dimethyl-butene-1, 3-hydroxy-pentadiene-1,4, 3-hydroxy-hexene-1-yne-5, 3-hydroxy-2-methyl-pentene-1-yne-4, and 4-hydroxy-2,5-dimethyl-hexadiene-1,5. Other allyl-type alcohols are crotyl alcohol, tiglyl alcohol, 3-chlorobutene-2-ol-1, cinnamyl alcohol, 1-hydroxy-hexadiene-2,4, 1-hydroxy-hexadiene-2,5, 1-hydroxy-butadiene-2,3, 2-hydroxy-hexadiene-3,5, 1-hydroxy-2-methyl-hexene-2, 1-hydroxy-2-methyl-pentene-2, 1-hydroxy-3,7-dimethyl-octadiene-2,7, 3-hydroxy-cyclopentene, 3-hydroxy-cyclohexene, etc.

Polymeric allyl-type alcohols can be made by the polymerization of the monomers by heating in the presence of oxygen or an oxygen-yielding polymerization catalyst such as benzoyl peroxide, hydrogen peroxide, barium peroxide, etc. The product is a mixture of oxy-condensation polymers of the allyl-type alcohol in which the monomer units are joined principally by carbon-to-carbon linkages but a minor proportion of the units are joined by ethereal oxygen atoms. The majority of functional groups in the polymer are hydroxy groups, although there are also present units from unsaturated acids, unsaturated aldehydes and/or unsaturated esters of unsaturated acids. For instance, in the case of allyl alcohol these units may be acrylic acid, acrolein and/or allyl acrylate. The oxy condensation polymerization of allyl-type alcohols is described and claimed in the co-pending application of Dannenberg and Adelson, Serial Number 420,388, filed November 25, 1941, which discloses a polymer of allyl alcohol having a molecular weight of about 300 indicating the average polymer molecule contained five monomer units.

Polymers of allyl-type alcohols can be formed also by the conversion of polymers of allyl-type alcohol derivatives to the alcohols. Preferred derivatives are halides and esters. Allyl-type halides can be polymerized by any of a plurality of methods, such as exposure to actinic light or treatment with boron trifluoride at a low temperature under anhydrous conditions, as disclosed in the co-pending application of Adelson and Dannenberg, Serial Number 417,140, filed October 30, 1941, now U. S. Patent 2,331,869. Polymers of allyl-type halides are with difficulty hydrolyzed to polymers of allyl-type alcohols by conventional techniques, such as treatment with an inorganic base. A preferred procedure is hydrolysis under the catalytic action of a cuprous compound, as disclosed in the co-pending application of Van de Griendt and Peters, Serial Number 340,990, filed June 17, 1940.

Polymers of allyl-type esters of saturated carboxylic acids, such as acetic, propionic, butyric, phthalic, etc. acids, can be formed by polymerizing the monomer with heat in the absence of added catalysts. More conveniently, there is present a polymerization catalyst, such as oxygen or an oxygen-yielding catalyst. The polymerization of allyl-type esters in the presence of oxygen and oxygen-yielding catalysts is described and claimed in the co-pending application of Adelson and Dannenberg, Serial Number 417,278, filed October 31, 1941. A number of types of inorganic salts also act as catalysts.

The polymers consist largely of monomer units joined by carbon-to-carbon linkages, although in some cases ethereal oxygen linkages may be present. Other allyl-type esters are those of ethereal oxygen-containing carboxylic acids. Still others are the allyl-type esters of inorganic acids, such as phosphoric acid and the ortho acids of boron and silicon.

Polymers of the allyl-type esters can be converted to the alcohols by hydrolysis or alcoholysis, the latter preferably in the presence of a basic metal alcoholate, as described and claimed in the co-pending application of Adelson and Evans, Serial Number 425,118, filed December 31, 1941, which discloses polyallyl alcohol having polymer molecules containing from 4 or 5 to 20 or more hydroxy groups therein. The polyallyl alcohol thus has a degree of polymerization of 4 to 20.

Still other methods can be used for forming polymeric allyl-type alcohols.

While in general the polymeric allyl-type alcohols operated upon in accordance with the invention will be compounds in which substantially all the functional groups attached to the chain of the polymeric molecule are hydroxyl groups, the invention embraces also partial polymeric allyl-type alcohols, in which other attached groups are present. Partial alcohols can be produced in many ways, the most common being the incomplete hydrolysis of a polymeric allyl-type derivative. For instance, the incomplete hydrolysis of a polymeric allyl-type ester gives a product having both hydroxyl groups and ester groups. Another example is a partial polymeric allyl-type acetal which may contain both acetal and ester groups and may contain in addition free hydroxyl groups.

The products of treatment in accordance with the invention are hydrogenated polymeric allyl-type alcohols. They contain more chemically-combined hydrogen than the starting materials, the amount of additional hydrogen ranging from about 0.002 gram to about 0.04 gram per gram of polymeric alcohol. In general the greater the amount of additional hydrogen, the greater the improvement in color. Preferred products contain at least 0.006 gram of combined hydrogen more than the unhydrogenated polymeric alcohol.

The hydrogenated polymeric allyl-type alcohols are characterized also by reduced unsaturation.

They are, of course, lighter in color than the unhydrogenated compounds. Preferred products are substantially water-white in the absence of other coloring substances. In addition, the products exhibit less tendency to discoloration with time than the unhydrogenated compounds, and so may be considered stabilized against discoloration.

Hydrogenated polymeric allyl-type alochols can be used alone or in admixture with one another or with other substances. Among the other substances useful in admixture with polymeric allyl-type alcohols are solvents, swelling agents, plasticizers, tackifiers, dyes, pigments, fillers, oils and plastic substances of many kinds, such as natural and synthetic resins, cellulose derivatives, protein plastics, etc. In some instances, it is desirable to combine the polymeric molecule with one or more such modifiers prior to hydrogenation, improved results being obtained by hydrogenating the mixture rather than the alcohol alone.

One of the most important general uses of polymeric allyl-type alcohols is the production of derivatives thereof. For instance, the alcohols can be esterified with higher unsaturated fatty acids, particularly mixtures of drying oil acids forming synthetic drying oils which may be the basis of valuable lacquers, paints and enamels. The alcohols can be converted to other esters and to acetals. With polybasic acids they form alkyd-type resins.

Since the objectionable color of discolored polymeric allyl-type alcohols carries over into the derivatives, decolorization of the alcohols is essential where the production of colorless or light-colored derivatives is of consequence. In some cases hydrogenation can be effected upon the derivatives themselves rather than upon the alcohols or both the alcohols and the derivatives formed therefrom can be hydrogenated.

Polymeric allyl-type alcohols and their derivatives can be put to multitudinous uses. Some of the compounds are solids which can be employed as turnery resins, and used as glass substitutes. Adhesives, coating compositions, impregnating compositions and sizes can be based upon the resins. A few find applications in molding and extrusion processes. In most of these and in many of the other uses to which the resins lend themselves the hydrogenated compounds are superior to the untreated compounds.

We claim as our invention:

1. A process for hydrogenating polyallyl alcohol which comprises subjecting polyallyl alcohol in basic medium and in the presence of a hydrogenation catalyst to the action of hydrogen at a temperature of about 100 to 200° C. under a pressure of 500 to 3000 pounds per square inch.

2. A process for hydrogenating polyallyl alcohol which comprises subjecting an alkaline solution of polyallyl alcohol in the presence of a hydrogenation catalyst to the action of hydrogen at a temperature of about 100 to 200° C. under a pressure of 500 to 3000 pounds per square inch.

3. A process for improving the stability of polyallyl alcohol toward discoloration which comprises subjecting an aqueous solution of polyallyl alcohol having a pH between 8 and 10 to the action of hydrogen in the presence of a nickel hydrogenation catalyst at a temperature of 155 to 175° C. under a pressure of 1500 to 3000 pounds per square inch.

4. A process for decolorizing discolored polyallyl alcohol which comprises subjecting an aqueous solution of barium hydroxide having dissolved therein about 25 per cent of the discolored polyallyl alcohol to the action of hydrogen in the presence of Raney nickel at a temperature of 155 to 175° C. under a pressure of about 1500 pounds per square inch, and repeating the foregoing operation with fresh catalyst until the polymer alcohol becomes colorless.

5. A process for hydrogenation which comprises neutralizing the acidity of an aqueous solution of polyallyl alcohol, and subsequently subjecting said polyallyl alcohol solution to the action of hydrogen in the presence of a base and a hydrogenation catalyst at a temperature of about 100 to 200° C. under a pressure of 500 to 3000 pounds per square inch.

6. A process hydrogenating polyallyl alcohol which comprises refluxing a solution of polyallyl alcohol in the presence of Raney nickel, separating the spent Raney nickel from the solution, and subjecting the treated solution to the action of hydrogen in the presence of fresh Raney nickel and a base at a temperature of 155 to 175° C. under a pressure of 500 to 3000 pounds per square inch.

7. Resinous hydrogenated polyallyl alcohol containing less unsaturation than the parent unhydrogenated polyallyl alcohol.

8. Water-soluble hydrogenated polyallyl alcohol containing at least 0.006 gram more of combined hydrogen per gram of polymer and having improved stability toward discoloration than the parent unhydrogenated polyallyl alcohol having a degree of polymerization of 4 to 20.

9. Hydrogenated polyallyl alcohol containing 0.002 to 0.04 gram more of combined hydrogen per gram of polymer than the parent polyallyl alcohol containing 4 to 20 hydroxy groups in the molecules thereof.

DAVID E. ADELSON.
HAROLD F. GRAY, Jr.